H. OSHIGE.
GAS SAVING AND HEAT RETAINING DEVICE.
APPLICATION FILED MAR. 25, 1920.
1,353,265.
Patented Sept. 21, 1920.
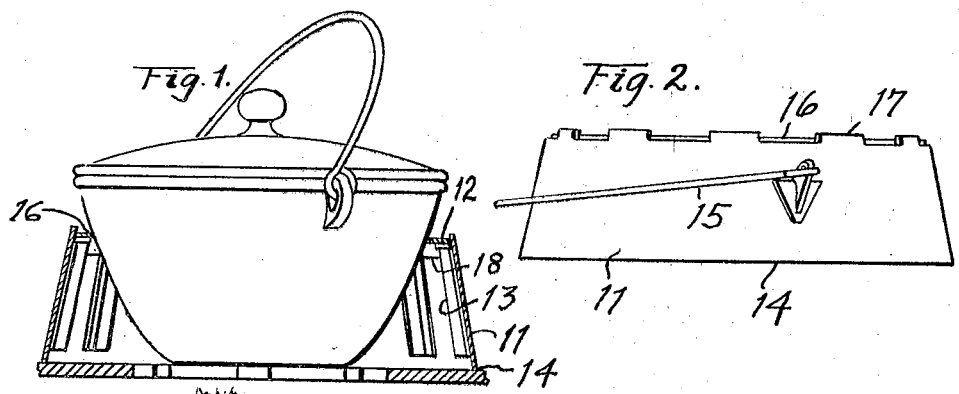
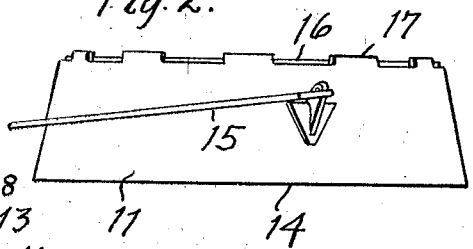
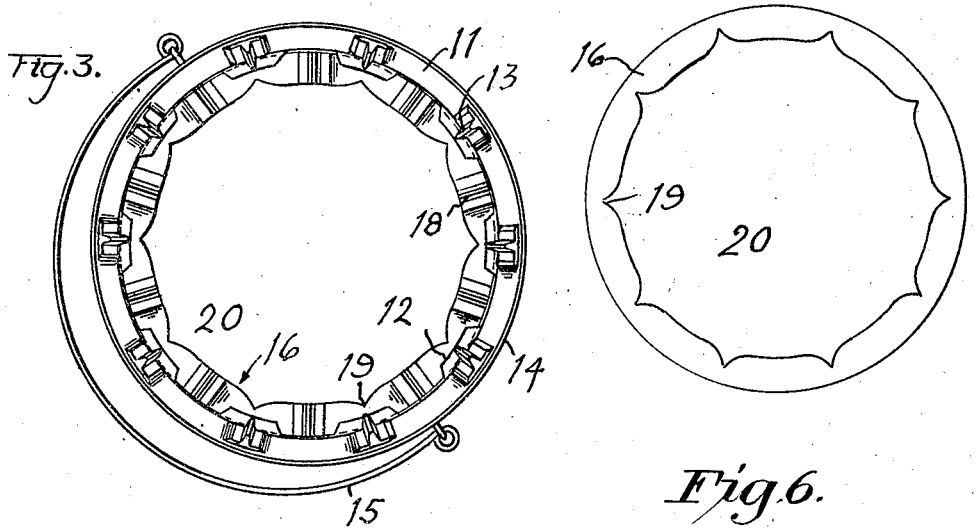
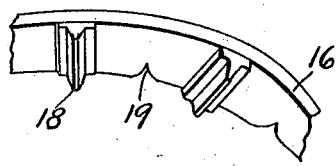
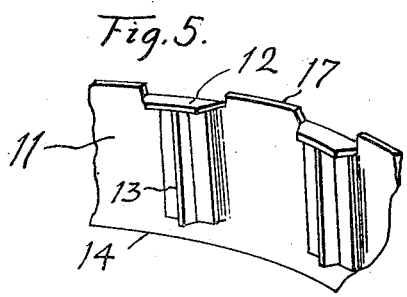
INVENTOR:
Heikichi Oshige.
By His Atty.
Edward M. Kojima

UNITED STATES PATENT OFFICE.

HEIKICHI OSHIGE, OF SANTA BARBARA, CALIFORNIA.

GAS-SAVING AND HEAT-RETAINING DEVICE.

1,353,265.  Specification of Letters Patent.  Patented Sept. 21, 1920.

Application filed March 25, 1920. Serial No. 368,699.

*To all whom it may concern:*

Be it known that I, HEIKICHI OSHIGE, a subject of the Emperor of Japan, residing in the city and county of Santa Barbara and State of California, have invented a new and useful Gas-Saving and Heat-Retaining Device, of which the following is a specification.

This invention has relation to an improved device for use with cooking utensils, and comprehends elements for jacketing the utensils above the place of combustion, so that the generated heat will be conserved and uniformly distributed and applied to the utensils, and its objects are to accomplish such conservation, distribution and application of the heat from the burner, with a maximum of saving and a minimum of waste, and to provide a ventilation for the jacketing elements which tends to eliminate the accumulation of soot upon the sides of the utensils.

Other objects and advantages may appear in the subjoined detail description.

Upon the annexed drawings, Figure 1 is a sectional view of the device applied to a cooking utensil, and showing fragments of a burner therebeneath. Fig. 2 is a side view of the device. Fig. 3 is a bottom plan view. Fig. 4 is a top plan view of the utensil supporting ring which forms the top of my gas-saving device. Fig. 5 is a fragmentary and perspective detail view of the body of the device. Fig. 6 is a fragmentary and perspective detail view of a supporting ring showing the radial ribs on the bottom thereof.

Referring to the drawings, the gas-saving device is provided with a substantially frusto-conoidal body 11, provided at the top with inwardly projecting flanges 12, extending approximately in a horizontal plane, and further provided with inwardly projecting and integral ribs 13, vertically disposed and extending from the flanges 12, and terminating slightly above the bottom 14. The body is provided with a swinging bail 15. The utensil supporting ring 16, is made detachable from the body, and is supported by the inwardly projecting flanges 12, and retained in position by the rim projections 17. Ring 16 is provided with radial and downwardly projecting and integral ribs 18. When ring 16 is seated upon the body 11, the ribs 18 are approximately disposed between the flanges 12, and alternate with ribs 13, and both series of ribs coöperate for deflection of the heat as will hereinafter appear. The inner edge of the ring is provided with notches 19, forming, with the sides of the supported utensil, vents for the products of combustion. Each gas-saving device may consist of a body, provided with a plurality of utensil-supporting rings, with the openings 20 graduated in size. The drawing shows but one of the supporting rings.

In use, the body incases the lower portion of the cooking utensil and is spaced apart from the walls thereof to inclose a jacket of heat. The vertical ribs serve to deflect the heat constantly upward, where the same is further deflected by the radial ribs on the supporting ring, to the vents formed by the notches on the inner edge thereof; the ring, when seated upon the inwardly projecting flanges of the body, serving to support the utensil centrally therewith.

Both series of ribs serve as baffles, and prevent the heat from forming circular currents around the utensil, and thereby preventing the formation of soot deposits on the walls thereof, and are integrally cast on the body and rings.

What is claimed is:

1. A heat retaining device comprising a substantially frusto-conoidal body, a series of inwardly projecting and horizontally disposed ribs extending therefrom, inwardly projecting and substantially vertical ribs disposed beneath the horizontal ribs, and a detachable utensil-supporting ring seated upon the first-named ribs.

2. A heat retaining device comprising a substantially frusto-conoidal body open at the top and bottom, inwardly projecting horizontal ribs arranged at the top, upwardly extending flanges alternating with the inwardly projecting ribs, vertical ribs disposed beneath the horizontal ribs and projecting from the inner wall of the body, a detachable utensil-supporting ring seated upon the inwardly projecting and horizontal ribs, and retained in central position by the upwardly extending flanges, the inner edge of the ring having a series of notches.

3. The combination with a frusto-conoidal body with inclined walls converging at the top and defining substantially circular top and bottom openings, a series of flanges projecting inwardly from the top, and a series of flanges projecting upwardly from the top, and a series of vertical ribs disposed beneath the inwardly projecting flanges, of an utensil supporting ring seated on the inwardly extending flanges and centrally retained by the upwardly extending flanges, said ring having an inner notched edge, and a series of radial and downwardly projecting ribs arranged on the lower side of the ring and alternating with the vent notches, and disposed approximately in alternation with the vertical ribs on the body.

4. The combination with a frusto-conoidal body converging at the top with circular top and bottom openings, inwardly projecting flanges at the top, and a vertically extending and inwardly projecting rib beneath each flange, of an utensil supporting ring seated on the flanges having a series of vent notches on its inner edge, and on its bottom a series of radial and downwardly projecting ribs alternating with the notches and vertically disposed ribs.

In testimony whereof, I hereunto affix my signature this 16th day of March, 1920.

HEIKICHI OSHIGE.